(12) United States Patent
Durieux

(10) Patent No.: US 12,516,761 B2
(45) Date of Patent: Jan. 6, 2026

(54) COUPLING ELEMENT AND PROCESS FOR MANUFACTURING SUCH A COUPLING ELEMENT

(71) Applicant: STAUBLI FAVERGES, Faverges-Seythenex (FR)

(72) Inventor: Christophe Durieux, Gilly sur Isere (FR)

(73) Assignee: STAUBLI FAVERGES, Faverges-Seythenex (FR)

( * ) Notice: Subject to any disclaimer, the term of this patent is extended or adjusted under 35 U.S.C. 154(b) by 0 days.

(21) Appl. No.: 18/784,727

(22) Filed: Jul. 25, 2024

(65) Prior Publication Data

US 2025/0035245 A1   Jan. 30, 2025

(30) Foreign Application Priority Data

Jul. 27, 2023   (FR) ...................................... 2308106

(51) Int. Cl.
*F16L 37/20* (2006.01)

(52) U.S. Cl.
CPC ................... *F16L 37/20* (2013.01)

(58) Field of Classification Search
CPC ............ F16L 37/20; F16L 37/18; F16L 37/22
See application file for complete search history.

(56) References Cited

U.S. PATENT DOCUMENTS

| 6,035,894 A * | 3/2000 | Weh |
| 10,865,925 B2 * | 12/2020 | Kuo |
| 2007/0035129 A1 | 2/2007 | Chappaz et al. |
| 2012/0086202 A1 * | 4/2012 | Tiberghien |
| 2014/0084583 A1 * | 3/2014 | Hemingway |
| 2014/0145430 A1 * | 5/2014 | Tiberghien |
| 2015/0233509 A1 * | 8/2015 | Tiberghien |
| 2017/0184241 A1 | 6/2017 | Tiberghien et al. |
| 2019/0333420 A1 * | 10/2019 | Danielson ............... F16L 37/20 |
| 2020/0363000 A1 * | 11/2020 | Tiberghien ............... F16L 37/22 |
| 2022/0290787 A1 | 9/2022 | Pastore et al. |

FOREIGN PATENT DOCUMENTS

| EP | 1752697 A1 | 2/2007 |
| EP | 3184870 A1 | 6/2017 |
| EP | 4056883 A1 | 9/2022 |
| WO | WO-2012/166546 A2 | 12/2012 |

OTHER PUBLICATIONS

French Application No. 2308106, Preliminary Search Report, Issued Jan. 15, 2024.

* cited by examiner

*Primary Examiner* — William S. Choi
(74) *Attorney, Agent, or Firm* — MARSHALL, GERSTEIN & BORUN LLP

(57) ABSTRACT

A quick-coupling element including a body and a pusher captive and movable within the monobloc body. The body is provided with at least one inner radial guiding surface. The pusher is provided with at least one outer radial guiding surface which cooperates with the inner radial guiding surface. Sections of a proximal opening and of a distal mouth of the body have maximum dimensions less than a radial size of the pusher. The pusher is movable, in an internal volume of the body, to a reference position, wherein the outer radial surface of the pusher is disengaged from any inner radial surface of the body, and vice versa.

20 Claims, 10 Drawing Sheets

A)

B)

COUPLING ELEMENT AND PROCESS FOR MANUFACTURING SUCH A COUPLING ELEMENT

FIELD

The present invention relates to a coupling element for connecting fluid lines and to a method for manufacturing such a quick-coupling element.

BACKGROUND

In the field of quick-couplings for connecting fluid pipes, it is known to mount, in the body of a coupling element, different parts, some of which slide longitudinally with respect to the body. To be able to house the parts one inside the other, it is often necessary to provide the body in a plurality of parts because the orifices provided at the proximal and distal ends of the body have small transverse dimensions, incompatible with the fitting of a sliding part inside the body.

On the other hand, it is known from WO2012/166546A2 to apply an additive manufacturing technique in the field of fluidic couplings. Such technique can be used for the manufacture of an outer coupling body, even with an angled configuration. In this type of material, a gasket can be manufactured simultaneously with the body, from a different material. There is no provision for a part to slide inside the body, which limits the application of such technology to a particular type of coupling elements.

SUMMARY

It is such drawbacks that the invention seeks more particularly to remedy by proposing a novel quick-coupling element for connecting a fluid pipe, compatible with additive manufacturing and which may include a sliding element.

To this end, the invention relates to a quick-coupling element for connecting fluid lines, said coupling element comprising a monobloc body defining a passage extending along a longitudinal axis of the coupling element, between a proximal end and a distal end, the proximal end being configured to be connected to a fluid pipe and defining a proximal opening for a passage for the fluid or a channel through which the fluid flows and the distal end having a distal mouth for receiving a mating coupling element.

According to the invention:
the coupling element comprises a pusher mounted in the body and movable along the longitudinal axis between a forward position on the distal end side and a rearward position on the proximal end side,
the body is provided with at least one inner radial guiding surface;
the pusher is provided with at least one outer radial guiding surface configured to engage the inner radial guiding surface to guide the pusher during longitudinal axis movements between forward and rearward positions thereof;
the pusher has a radial size defined by the largest radial dimension thereof,
a section of the proximal opening, transverse to the longitudinal axis, has a maximum dimension less than the radial dimension of the pusher;
a section of the distal mouth, transverse to the longitudinal axis, has a maximum dimension less than the radial size of the pusher;
the pusher is mounted captive in an internal volume of the body; and
the pusher is movable, in the internal volume of the body, up to a reference position, wherein the or each outer radial surface of the pusher is disengaged from any inner radial surface of the body and vice versa.

By means of to the invention, the ability to move the pusher to the reference position allows the body and the pusher to be made by additive manufacturing, in a configuration where the pusher is in the reference position, without thereof being a hindrance to the production of the inner or outer radial guiding surfaces, which can be defined with good precision. The pusher does not need to be inserted into the body at a later stage of the manufacturing process, which simplifies the process.

According to advantageous but non-mandatory aspects of the invention, such a coupling element can incorporate one or a plurality of the following features, taken individually or according to any technically permissible combination:

When the pusher is in the reference position, a clearance between a surface of the pusher and an inner radial surface of the body facing the surface of the pusher has a radial thickness strictly greater than the radial thickness of a guiding clearance between the outer radial surface of the pusher and the inner radial surface of the body engaged one within the other.

The pusher is provided with two outer radial guiding surfaces spaced apart along the longitudinal axis, the body is provided with two inner radial guiding surfaces, each of the inner radial guiding surfaces being configured to engage with an inner radial guiding surface to guide the pusher during the movement along the longitudinal axis between the forward and rearward positions thereof, and when the pusher is in the reference position, the two outer radial guiding surfaces are disengaged from the two inner radial guiding surfaces of the body.

The outer radial guiding surface is inscribed in a first cylinder with a circular base, the radial inner guiding surface is inscribed in a second cylinder with a circular base and the diameter of the first cylinder is equal to the diameter of the second cylinder, to within the guiding clearance.

Clearance grooves are provided in the inner radial guiding surface.

Clearance grooves are provided in the outer radial guiding surface.

The outer radial guiding surface has a first length, measured parallel to the longitudinal axis, the inner radial guiding surface has a second length, measured parallel to the longitudinal axis and the second length is greater than or equal to the sum of the first length and one travel of the pusher between the forward and rearward positions thereof or the first length being greater than or equal to the sum of the second length and the travel of the pusher between the forward and rearward positions thereof.

The coupling element comprises a hollow channel defining a passage for fluid and extending along a longitudinal axis of the coupling element between a front part configured to fit onto a hose and a rear part intended to be coupled to the fluid pipe, a monobloc body extending along the longitudinal axis about the hollow channel and secured thereto and defining an access mouth to the front part of the hollow channel, a first jaw movable in rotation about a first axis of rotation perpendicular to and offset from the longitudinal axis between a clamping position wherein the first jaw presses the hose against the front part of the hollow channel in a zone comprised, radially to the longitudinal axis between the longitudinal axis and the first axis of rotation and bounded along the longitudinal axis by a boundary plane, perpendicular to the longitudinal axis and spaced from the first axis of rotation by a first distance, measured parallel to the longitudinal axis, which is non-zero, and a retracted position wherein the first jaw does not press the hose against the front part of the hollow channel, a maneuvering member, accessible from outside the body, for the movement of the first jaw between the clamping position thereof and the released position thereof, an elastic return member of the pusher towards the forward position thereof, while the pusher is trapped inside the internal volume of the body, around the hollow channel and provided with a first support surface against the first jaw, the first support surface of the pusher being configured to exert on the first jaw, a force to move the first jaw from the released position thereof to the clamping position thereof, the first support surface being arranged opposite the first axis of rotation in relation to the longitudinal axis and, when the first jaw is in the clamping position thereof, with the first support surface against the first jaw, a first radial gap measured perpendicular to the longitudinal axis, between the first axis of rotation and a point of contact of the force receiving surface of the first jaw and the first support surface having a value greater than the value of the first distance.

The body comprises an internal part provided with apertures which open into the mouth and an external part mounted around the internal part and movable, with respect to the internal part, in translation along the longitudinal axis, the coupling element comprising locking members, movable in the apertures of the internal part of the body, between a locking position, wherein same protrude into the mouth, and a disengaged position, wherein same do not protrude into the mouth,

- a member for elastic return of the pusher toward the forward position thereof;
- the external part of the body being movable relative to the internal part of the body between a first position wherein same holds the locking members in the locking position thereof and a second position wherein same allows the locking members to return to the disengaged position thereof and the pusher is mounted radially between the internal and external parts of the body and exerts on the locking members, a return force toward the locking position thereof.

According to a second aspect, the invention relates to a method of manufacturing a coupling element as mentioned hereinabove, which comprises a step a) consisting in simultaneously producing at least part of the monobloc body and the pusher by additive manufacturing, while the pusher is in the reference position thereof.

BRIEF DESCRIPTION OF THE DRAWINGS

The invention will be better understood and other advantages thereof will appear more clearly in the light of the following description of four embodiments of a quick-coupling element according to the principle thereof and to the manufacturing method thereof, given only as an example and made with reference to the enclosed wherein.

DESCRIPTION

Figure 1:
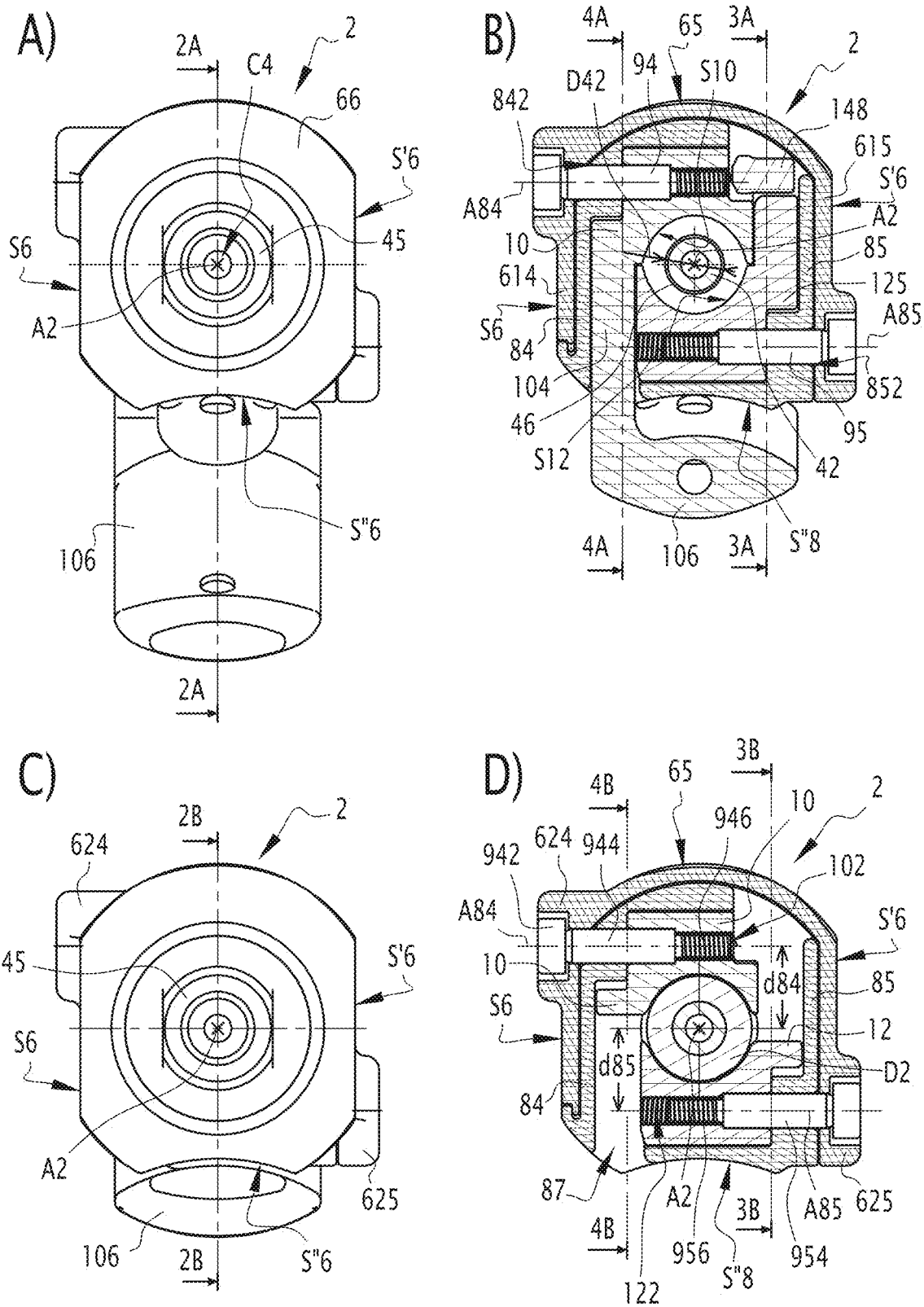
FIG. 1 shows, on four inserts A), B), C) and D), two elevation views and two cross-sections of a coupling element according to the invention, in two different configurations. Insert B) represents a section along plane 1B-1B visible on insert A) of FIG. 2. Insert D) represents a cross-section and along plane 1D-1D visible on insert B) of FIG. 2.

The quick-coupling element 2 shown in FIGS. 1 to 5 is designed to be connected, on the one hand, to a pipe C2 and, on the other hand, to a hose D2. For the clarity of the drawing, the pipe C2 is shown only in FIG. 2, in dash-dot lines, and the hose D2 is shown only in FIGS. 1, 2, 4 and 5. A hose is a special type of pipe for fluid flow, which has the particularity of being flexible and which can expand radially. The hose D2 herein forms a coupling element mating to the coupling element 2.

The fluid passing through the pipe C2 and through the hose D2 may be a liquid or a gas, in particular with a relatively high pressure, e.g. greater than or equal to 1 MPa.

The front side of the coupling element 2 is defined as the side oriented towards the hose D2 during the fitting on of the coupling element 2 and of the hose D2 or when said elements are connected. In FIGS. 2 to 5, the front side of the coupling element 2 is oriented to the left and the rear side is oriented to the right. The coupling element 2 extends, between the front and rear sides thereof, along a longitudinal axis A2.

The elevation views shown in FIG. 1 are taken from the rear of the coupling element 2.

The coupling element comprises a hollow channel 4 which extends along the longitudinal axis A2 and which has a chamfered front part 42 and a tapped rear part 44. The hollow channel 4 defines a channel C4 for the passage of fluids between the front and rear parts 42 and 44 thereof.

D4 denotes the external diameter of the hollow channel 4 over the greater part of the length thereof, between the front and rear parts thereof. D42 denotes the external diameter of the front part 42, which is small compared to the external diameter D4. The passage section of the channel C4 has, at the front part 42, a surface area smaller than the surface area thereof in the intermediate part and at the rear part 44.

The front part 42 of the hollow channel 4 is provided with two peripheral ribs 46 which form reliefs for holding the hose D2 on said part.

The front part 42 has a chamfer 48 converging toward the front and the function of which is to facilitate the insertion of the hollow channel 4 into the hose D2.

The rear part 44 is equipped with an internal tapping 49 for mounting the pipe C2.

In the example of the figures, the hollow channel 4 is in one-piece. In a variant (not shown), same may consist of a plurality of parts assembled in leak-tight manner with one another.

Close to the rear part 44 thereof, the hollow channel 4 comprises a collar flange 45 and an external thread 47.

The coupling element 2 further comprises a body 6 which is in one-piece and which extends along the longitudinal axis A2, between a front end 62 and a rear end 64. Seen from the pipe C2, the rear end 64 is a proximal end and the front end 62 is a distal end of the body 6.

At the front or distal end 62 thereof, the body 6 defines a mouth 63 centered on the longitudinal axis A2 and through which the front part 42 of the hollow channel 4 protrudes, toward the front of the coupling element 2. The mouth 63 gives access to the front part 42 of the hollow channel.

The diameter of the mouth 63 is denoted by D63.

The internal volume of the body 6 is denoted by V6. The hollow channel is, for the most part, received in the internal volume V6, except for the part of the front part 42 protruding through the mouth 63.

At the rear end 64 thereof, the body 6 is provided with a tapping 67 which cooperates with the thread 47 of the cannula 4 to screw the cannula 4 into the body 6 until the collar flange 45 abuts against the rear or proximal end 64, which secures the elements 4 and 6 and positions the hollow channel 4 with respect to the body 6 along the longitudinal axis A2.

The diameter of the tapping 67 is denoted by D67. The tapping defines a proximal opening for the passage of the hollow channel 4 through the body 6.

66 denotes the intermediate part of the body 6 defined along the axis A2 between the front and rear ends 62 and 64 thereof. At the intermediate part 66, the body 62 has an external geometry generally in the form of a cylinder truncated by two planes, parallel to the planes of FIGS. 2 to 4 and which define two lateral surfaces S6 and S'6 arranged on either side of the sectional plane of insert A) shown in FIG. 2. 614 and 615 respectively denote the generally flat lateral walls of the body 6 which define, on the outside, the surfaces S6 and S'6.

The body 6 also defines a concave external surface S"6 which is situated between the surfaces S6 and S'6, at the lower part of the body 6 in the position shown in FIGS. 1 to 4.

Between the surfaces S6, S'6 and S"6, the body 6 has outer serrations 65 which facilitate the grip thereof.

On the side of the concave surface S"6 and on the front thereof, the body 6 defines an opening O6 with an overall rectangular shape and through which a housing 8 is engaged in the internal volume V6 of the body 6.

The housing 8 comprises a front face 82 which is perpendicular to the longitudinal axis A2 in the mounted configuration of the housing 8 in the body 6 and wherein is provided a circular orifice 83 which is aligned with the mouth 63 in said configuration. The orifice 83 serves for the passage of the front part 42 of the hollow channel 4 and of the hose D2.

The housing 8 comprises two lateral walls 84 and 85 which extend parallel to each other from a cover 86. The cover 86 closes the opening O6 in the mounted configuration of the housing 8 in the body 6 and defines a concave surface S'8 which is flush with the surface S"6 of the body 6 in such configuration.

A notch 87 is provided in the cover 86 and opens onto the rear side of the housing 8.

In the mounted configuration of the housing 8 in the body 6, the lateral walls 84 and 85 extend parallel to the lateral walls 614 and 615, and thus parallel to the surfaces S6 and S'6. Preferably, the lateral walls 84 and 85 extend along the lateral walls 614 and 615 respectively, into the internal volume V6, and thus on the inside of the lateral walls 614 and 615.

The lateral wall 84 is pierced by a through orifice 842 provided at a thickened part of the lateral wall 84 and which defines a level centered on an axis A84 perpendicular to the longitudinal axis A2 and spaced from same by a distance D84, measured perpendicular to the axes A2 and A84, which is non-zero. In the same way, the lateral wall 85 is pierced by a through orifice 852 provided at the thickened part of the wall 85. The through orifice 852 defines a level centered on an axis A85. The axis A85 is perpendicular to the axis A2 and is located at a non-zero distance d85 from the axis A2, the distance d85 being measured perpendicular to the axes A2 and A85.

Advantageously, and as shown in the figures, the axes A84 and A85 are parallel and the distances d84 and d85 are equal. Thereby, in a transverse plane of the coupling element 2, i.e. a plane perpendicular to the longitudinal axis A2, the axes A84 and A85 are symmetrical with respect to the longitudinal axis A2. However, the above is not mandatory.

The body 6 is provided, at the surfaces 614 and 615 thereof, with two seats 624 and 625 which are aligned with the through orifices 842 and 852, respectively, and centered on the axes A84 and A85 in the mounted configuration of the housing 8 in the body 6.

The coupling element 2 also comprises a first jaw 10 and a second jaw 12.

The first jaw 10 is articulated about the axis A84 on the body 6 equipped with the housing 8. To this end, a first partially threaded screw 94 is inserted into the bearing formed by the through orifice 842, extending through the seat 624 and being screwed into the jaw 10. The head 942 of the screw 94 is received in the seat 624, whereas the rod 944 thereof extends through the orifice 842 and is screwed, by a threaded part 946, into a tapped orifice 102 of the jaw 10.

In a comparable manner, the second jaw 12 is articulated about the axis A85 by means of a partially threaded screw 95 the head 952 of which is received in the seat 625, the rod 954 of which extends through the orifice 852 and is screwed by a threaded part 956, in a tapped orifice 122 of the jaw 12.

Each of the first and second jaws 10 and 12 is movable about the axis A84 or the axis A85, respectively, relative to the body 6 equipped with the housing 8, between a clamping position and a retracted position, in other words, a released position. The axis A84 is thereby a first axis of rotation of the first jaw 10, whereas the axis A85 is a second axis of rotation of the second jaw 12. In the clamping position thereof, if the hose D2 is fitted onto the hollow channel 4, the jaw 10 or 12 presses the hose against the outer radial surface S42 of the front part 42 of the hollow channel. In the retracted position thereof, the jaw 10 or 12 does not press the hose against the outer radial surface of the front part of the hollow channel.

Figure 2:
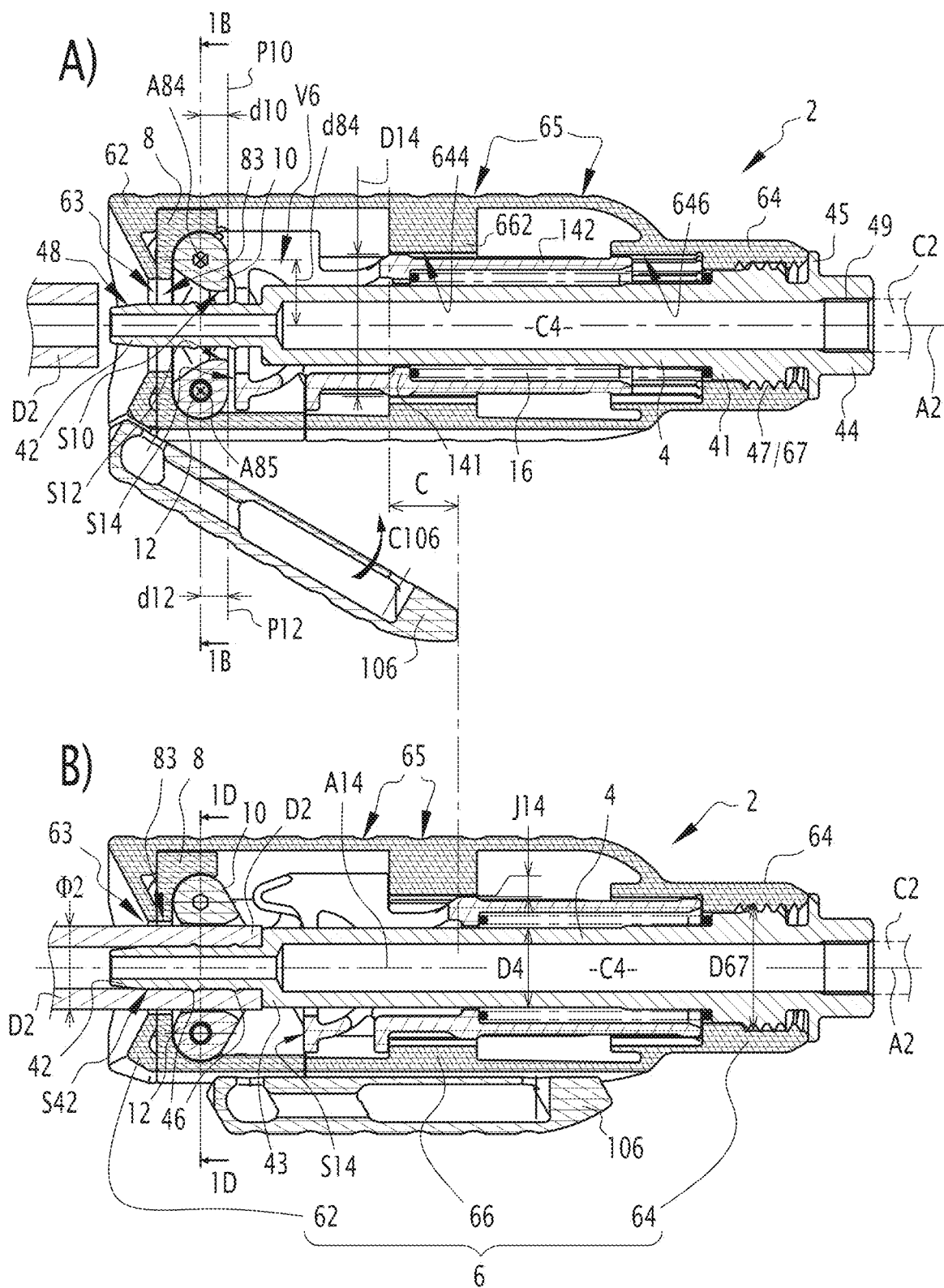
FIG. 2 shows, on two inserts A) and B), two longitudinal sections of the coupling element, taken respectively along the plane 2A-2A and along the plane 2B-2B at the inserts A) and C) of FIG. 1.
Figure 3:
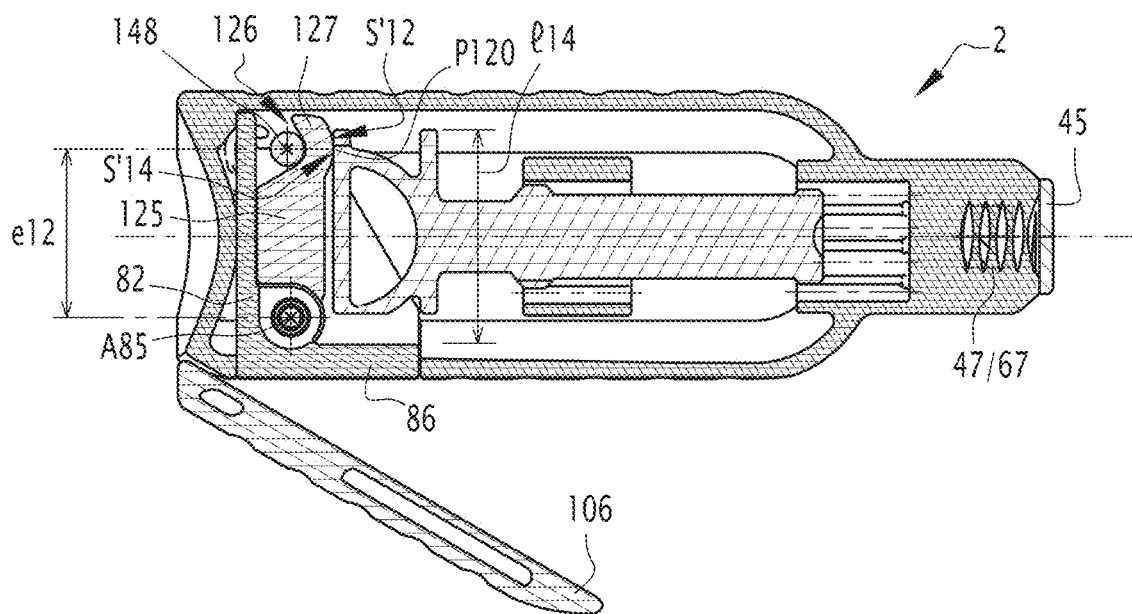
FIG. 3 shows, on two inserts A) and B), two longitudinal sections of the same coupling element, taken along the plane 3A-3A and along the plane 3B-3B on the inserts B) and D), respectively, of FIG. 1.
Figure 3:
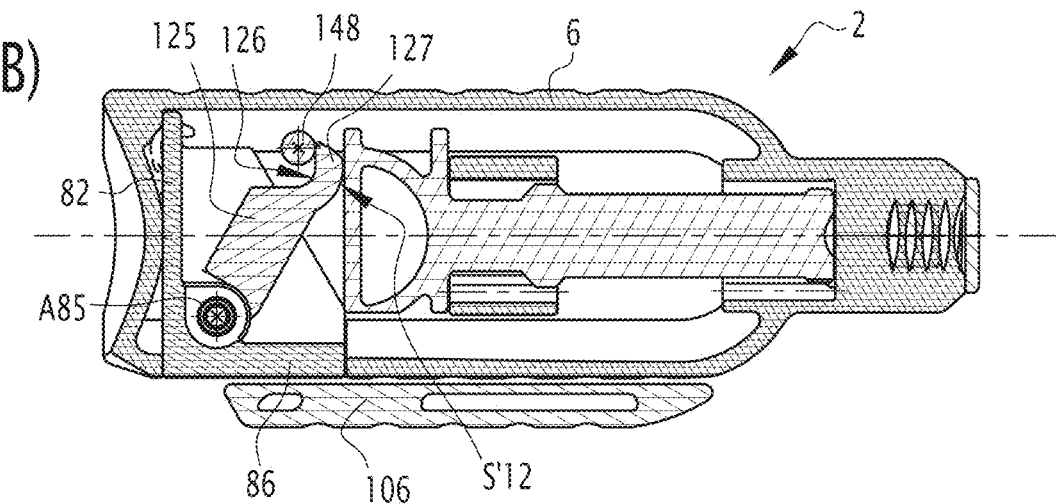
Figure 4:
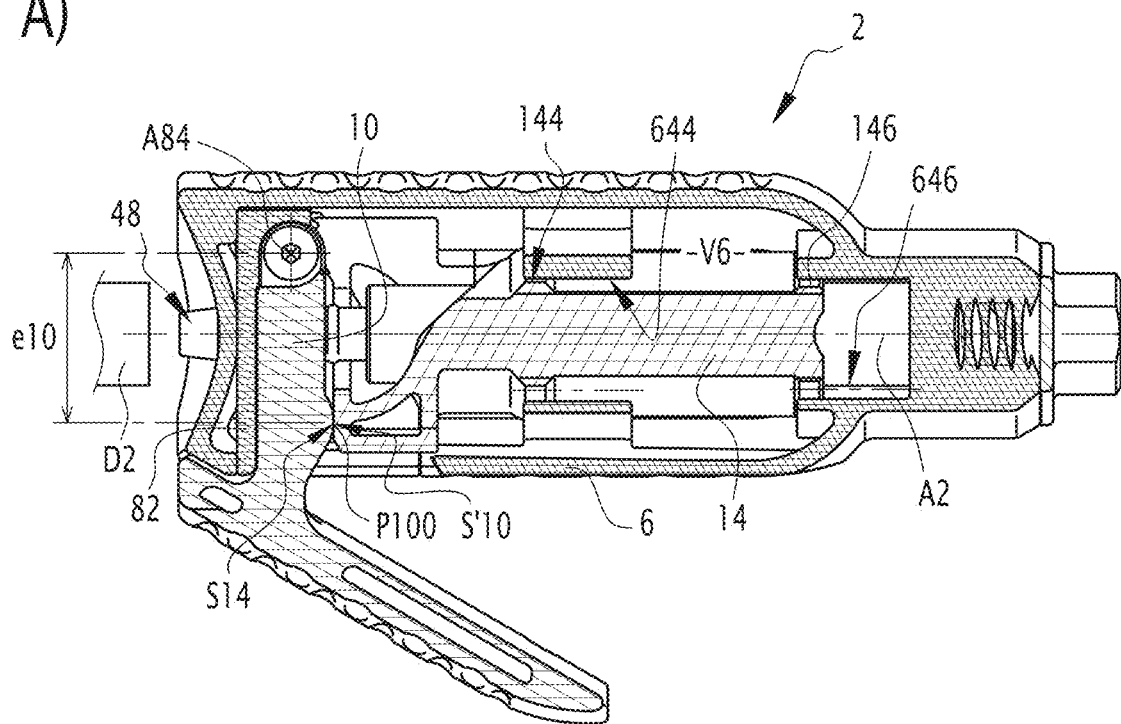
FIG. 4 shows, on two inserts A) and B), two longitudinal sections of the same coupling element, taken along the plane 4A-4A and along the plane 4B-4B on the inserts B) and D), respectively, of FIG. 1.
Figure 4:
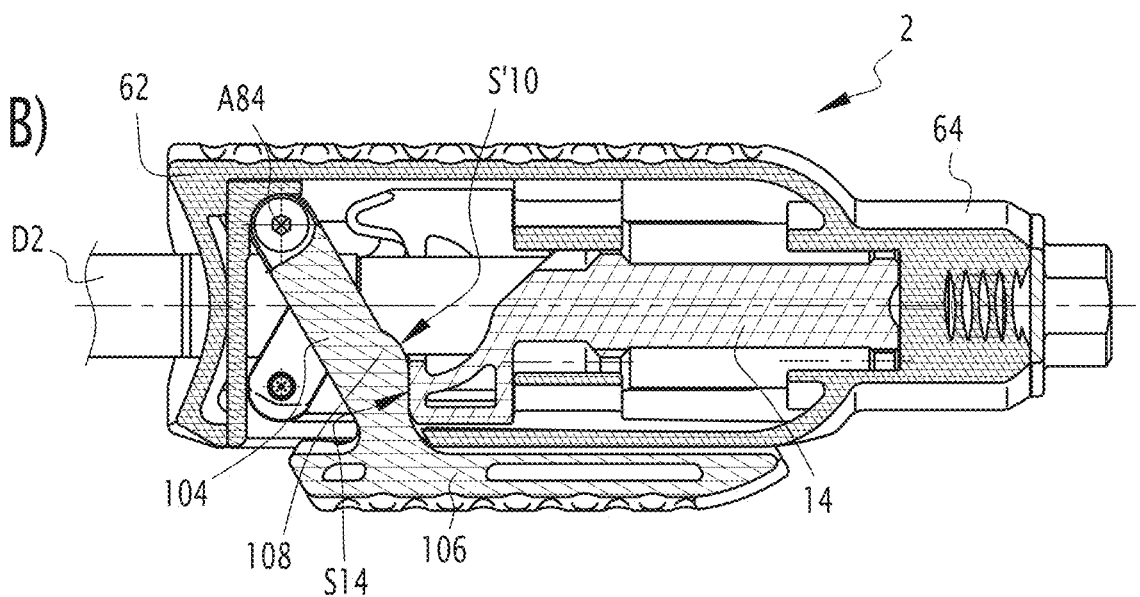
Figure 5:
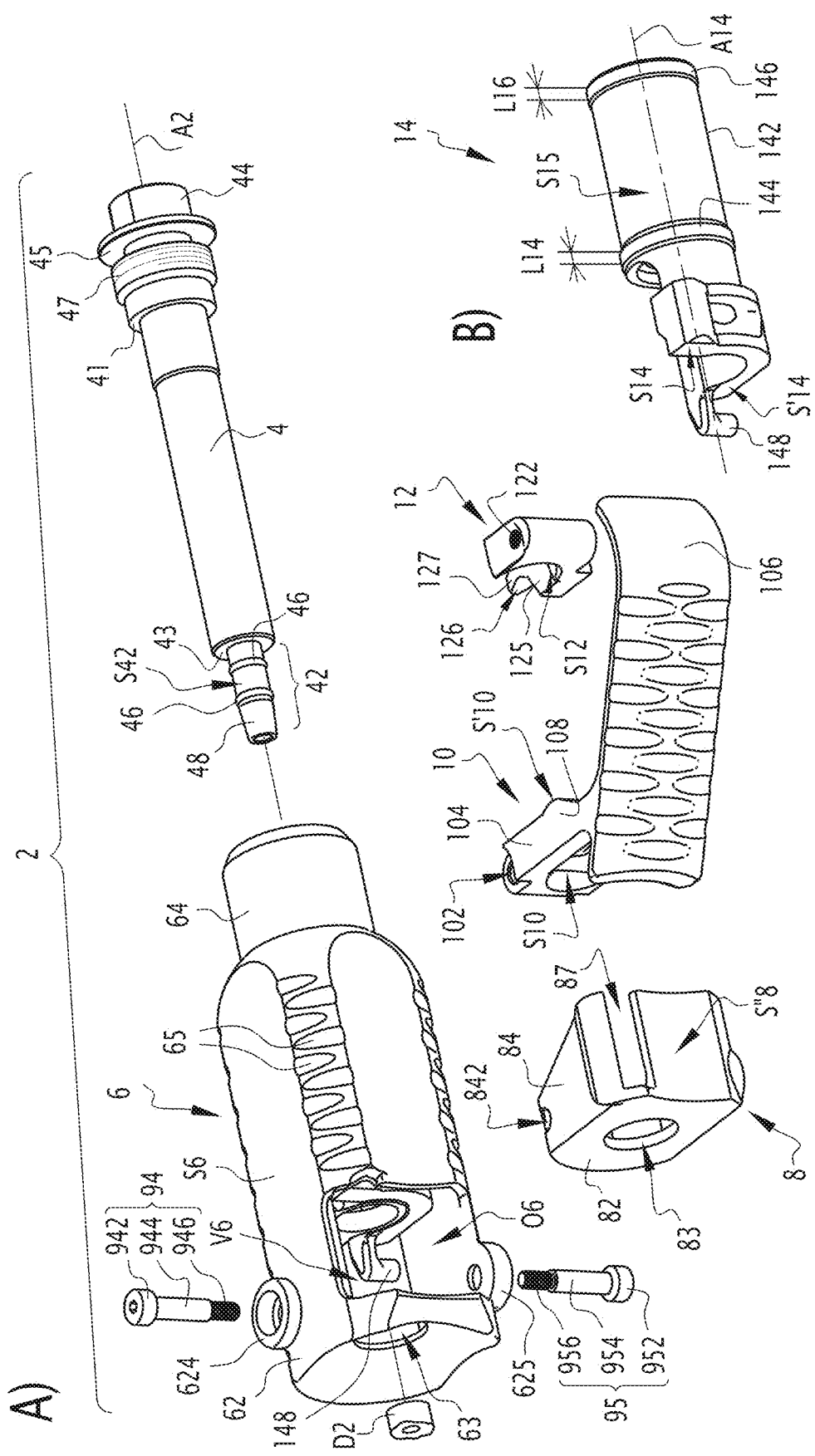
FIG. 5 shows, on two inserts A) and B), the coupling element in perspective and in exploded view, as well as a pusher belonging to the coupling element, also in perspective.

The clamping position of the jaws 10 and 12 is shown on the inserts A) and B) of FIG. 1 as well as on the inserts A) of FIGS. 2 to 4, the hose being shown on the outside of the coupling element 2 on the insert A) of FIGS. 2 and 4. The retracted position of the jaws 10 and 12 is shown on the insert D) of FIG. 1, as well as on the inserts B) of FIGS. 2 and 4, the hose D2 being shown in the unclamped position on the front part 42 of the hollow channel 4 on the insert B) of FIGS. 2 and 4.

The first jaw 10 defines a support surface S10 on the hose D2, when the first jaw 10 is in the clamping position thereof and when the hose is fitted onto the hollow channel. The second jaw S12 also defines a support surface S12 against the hose D2 when the second jaw 12 is in the clamping position thereof and when the hose is fitted onto the hollow channel.

Each support surface S10 or S12 has a progressive profile with respect to the front part 42 of the hollow channel 4 which is such that, when the jaw 10 or 12 is in the clamping position, the distance between the longitudinal axis A2 and an orthogonal projection of the support surface S10 or S12 on a plane perpendicular to the longitudinal axis, is less than half the external diameter $\phi 2$ of the free hose D2 fitted onto the front part 42 of the hollow channel 4, whereas, when the jaw 10 or 12 is in the retracted position, the distance between the longitudinal axis A2 and the projection of the support surface S10 or S12 onto the same perpendicular plane is greater than half the external diameter $\phi 2$.

The zone defined by the support surface S10, wherein the first jaw 10 presses on the hose D2 against the front part 42 of the hollow channel 4 in the clamping position of the first jaw, is comprised, radially to the longitudinal axis A2, between the longitudinal axis and the first axis of rotation A84. In the clamping position, the zone wherein the first jaw 10 presses on the hose D2 is limited toward the rear, i.e. away from the first axis of rotation A84 along the longitudinal axis A2, by a boundary plane P10 which is perpendicular to the longitudinal axis A2 and which passes through the point on the support surface S10 furthest from the first axis of rotation A84 along a direction parallel to said longitudinal axis. d10 denotes the distance, measured parallel to the longitudinal axis A2, between the first axis of rotation A84 and the boundary plane P10.

The distance D10 is the maximum lever arm of the resisting force exerted by the hose D2 on the first jaw 10 in the clamping position, when the hose is fitted onto the hollow channel 4.

The zone defined by the support surface S12, wherein the second jaw 12 presses on the hose D2 against the front part 42 of the hollow channel 4 in the clamping position of the second jaw, is comprised, radially to the longitudinal axis A2, between the longitudinal axis and the second axis of rotation A85. In the clamping position, the zone wherein the second jaw 12 presses on the hose D2 is limited toward the rear, i.e. away from the second axis of rotation A85 along the longitudinal axis A2, by a boundary plane P12 which is perpendicular to the longitudinal axis A2 and which passes through the point on the support surface S12 furthest from the second axis of rotation A85 along a direction parallel to said longitudinal axis. d12 denotes the distance, measured parallel to the longitudinal axis A2, between the second axis of rotation A85 and the boundary plane P12.

The distance d12 is the maximum lever arm of the resisting force exerted by the hose D2 on the second jaw 12 in the clamping position, when the hose is fitted onto the hollow channel 4.

In the example in the figures, the axes of rotation A84 and A85 are arranged at the same level along the longitudinal axis A2, as are the boundary planes P10 and P12. Thereby, the distances D10 and D12 are equal.

However, thereof is not mandatory and other spatial distributions of the first and second axes of rotation A84 and A85 and of the first and second boundary planes P10 and P12 are conceivable.

The first jaw 10 comprises a lateral arm 104 which extends radially to the first axis of rotation A84 and which defines a surface S'10 for receiving a force. The force-receiving surface S'10 is formed on the rear of the lateral arm 104 and opposite the first axis of rotation A84 with respect to the longitudinal axis A2. In other words, in a plane parallel to the longitudinal axis A2 and perpendicular to the first axis of rotation A84, the first axis of rotation A84 and the force-receiving surface S'10 are located on either side of the longitudinal axis A2, as shown in FIG. 4.

The second jaw 12 further comprises a lateral arm 125 which extends radially to the second axis of rotation A85 and which defines a force-receiving surface S'12. The force-receiving surface S'12 is provided on the rear of the lateral arm 125. In a plane parallel to the longitudinal axis A2 and perpendicular to the second axis of rotation A85, the second axis of rotation A85 and the force-receiving surface S'12 are arranged on either side of the longitudinal axis A2, as shown in FIG. 3.

The lateral arm 125 is provided, at the end thereof opposite the tapped orifice 122, with a hook 127 which defines a concave recess 126. The force-receiving surface S'12 is formed on the outside of the hook 127, opposite the concave recess 126.

In the assembled configuration of the coupling element 2, the lateral arms 104 and 125 are adjacent to the lateral walls 84 and 85, respectively, of the housing 8 and arranged on the inside of the walls, with respect to which same can pivot about the axes of rotation A84 and A85, respectively.

The first jaw further comprises a maneuvering member formed by a lever 106 which protrudes from the body 6 and from the housing 8 through the notch 87. The lever 106 is in one-piece with the part of the first jaw 10 wherein the tapped orifice 102, the support surface S10 are provided, as well with the lateral arm 104, and hence with the force-receiving surface S'10.

The lever 106 makes it possible to maneuver the first jaw 10 between the clamping position thereof and the retracted position thereof, by pressing the lever 106 toward the surfaces S"6 and S"8, which makes same to pivot about the first axis of rotation A84, counter-clockwise in FIG. 2. The clamping position of the insert A) of FIGS. 2 to 4 is a default position taken by the jaw 10 if no force is exerted on the lever 106 by a user of the coupling element 2.

The coupling element 2 also comprises a pusher 14 which extends along a longitudinal axis A14 coinciding with the longitudinal axis A2 in the mounted configuration of the coupling element 2.

The pusher 14 is mounted inside the body 6, in the internal volume V6 and around the hollow channel 4, between the front and rear parts 42 and 44 thereof along the longitudinal axis A2, being subject to the action of an elastic member, in the example formed by a spiral spring 16 which tends to push the pusher 14 forwards, i.e. toward the front end 62 of the body 6. The advanced position of the pusher 14, shown in the inserts A) of FIGS. 2 to 4, is a default position of the pusher, taken by the latter under the action of the spiral spring 16 as long as a user does not fold the lever 106 toward the surfaces S"6 and S"8.

In a variant, the spring 16 can be replaced by another elastic member for returning the pusher toward the front of the body 6.

The pusher 14 is designed to move longitudinally, i.e. in translation parallel to the longitudinal axis A2, with respect to the body 6, the housing 8 and the jaws 10 and 12. The pusher thus forms a slide with respect to the body 6, the housing 8 and the jaws 10 and 12.

The pusher 14 comprises an annular skirt 142 centered on the axis A14 and provided, at each of the ends thereof, with an outer radial guiding surface, namely, a front outer radial guiding surface 144 and a rear outer radial guiding surface 146.

In practice, the outer radial guiding surfaces 144 and 146 have a circular cross-section. Thereby, the outer guiding surfaces are each inscribed in a cylinder with a circular base, of diameter D14 or D16.

D14 and D16 denote the diameters thereof, which preferably have the same value.

In a variant of the invention (not shown), the diameters D14 and D16 have different values.

L14 denotes the axial length of the front outer radial guiding surface 144 and L16 denotes the axial length of the rear outer radial guiding surface 146, the axial lengths being measured parallel to the longitudinal axis A14.

In the example, and according to an advantageous aspect of the invention, the lengths L14 and L16 are equal.

In a variant of the invention (not shown), same may be different.

S15 denotes the outer radial surface of the skirt 142 situated, along the longitudinal axis A14, between the outer radial guiding surfaces 144 and 146 which are spaced from each other along the longitudinal axis A2. The diameter of the surface S15 is denoted by D15.

The diameter D15 is strictly smaller than the diameters D14 and D16. In other words, the surface S15 defines a cylindrical junction surface the diameter D15 of which is less than the diameter D14 of the front outer radial guiding surface 144 and the diameter D16 of the rear outer radial guiding surface 146.

The body 6 is provided with a front inner radial guiding surface 644 and a rear inner radial guiding surface 646, both centered on the longitudinal axis A2. The front inner radial guiding surface 644 is formed at the center of an inner peripheral rib 662 of the intermediate part 66 of the body 6. The rear inner radial guiding surface 644 is formed at the junction between the intermediate 66 and rear 64 parts of the body 6.

L64 and L66 denote the axial length of the front and rear internal radial surfaces 644 and 646, respectively, the axial lengths being measured parallel to the longitudinal axis A2.

The front inner radial surface 644 is provided with grooves 648 which extend throughout the length L64 thereof, whereas the rear inner radial guiding surface 646 is provided with grooves 650 which extend throughout the length L66 thereof.

In a radial plane perpendicular to the longitudinal axis A2, the apexes of the ribs which separate the grooves 648 define a circle inscribed in the front inner radial guiding surface 644, the diameter of which is denoted by D64. Similarly, in a plane radial to the longitudinal axis A2, the apexes of the ribs which separate the grooves 650 define a circle inscribed on the rear inner radial guiding surface 646, the diameter of which is denoted by D66. Thereby, the internal guiding surfaces are each inscribed around a cylinder with a circular base, of diameter D64 or D66.

The diameters D64 and D66 advantageously have the same value, as do the diameters D14 and D16.

In a variant of the invention (not shown), the diameters D64 and D66 have different values.

In any case, the diameters D14, D64, D16 and D66 are chosen so that the radial guiding surfaces 144 and 644, on the one hand, and 146 and 646, on the other hand, effectively guide the pusher 14 in translation along the axis A2, inside the body 6, during the sliding thereof with respect to the body 6.

The ratio of the diameters D14 and D64 and the ratio of the diameters D16 and D66 are such that a guiding clearance J14 of relatively small radial thickness, e.g. on the order of a few tenths of a millimeter, is provided between the outer and inner radial guiding surfaces 144 and 644, on the one hand, and 146 and 646, on the other. In other words, the diameters D14, D16, D64 and D66 are equal, within the guiding clearance J14.

C denotes the travel of the pusher 14 under the action of the spring 16. The travel corresponds to the passage of the pusher 14 from the position of the insert B) in one of the FIGS. 2 to 4, which is a rear position of the pusher 14 with respect to the body 6, to the position of the insert A) in said figures, which is a forward position of the pusher 14 with respect to the body 6, or vice versa when moving from the position of the insert A) to the position of the insert B).

The length L64 is greater than or equal to the sum of the length L14 and of the travel C. Similarly, the length L66 is greater than or equal to the sum of the length L16 and of the travel C.

We have the following relations:

$$L64 \geq L14 + C \qquad \text{(equation 1)}$$

$$L66 \geq L16 + C \qquad \text{(equation 2)}$$

By means of said relations between the lengths L14 and L64, L16 and L66 and the travel C, during the operation of the coupling element 2, the front outer radial guiding surface 144 remains opposite the front inner radial guiding surface 644 and the rear outer radial guiding surface 146 remains opposite the rear inner radial guiding surface 646 along the longitudinal axis A2.

On the front side thereof, the pusher 14 defines a first support surface S14 which is perpendicular to the axis A14 and which abuts against the force-receiving surface S'10 of the first jaw 10, under the action of the return spring 16, provided that the lever 106 is not folded back toward the body 6, i.e. when the first jaw 10 is by default in the clamping position thereof. In other words, by default, the elastic force of the spring 16 is transmitted to the pusher 14 which exerts, via the first support surface S14 and on the-force receiving surface S'10, an axial force directed forwards, the effect of which is to return the first jaw 10 to the clamping position thereof.

Thereby, the return spring 16, which is a member for elastically returning the pusher 14 to the advanced position thereof, is also a member for returning the first jaw 10 to the clamping position thereof.

The pusher 14 is oriented about the axis A2 in such a way that the support surface S14 thereof is situated, in a plane perpendicular to the first axis of rotation A84, on the side of the longitudinal axis A2 opposite the first axis of rotation 84. A radial gap measured perpendicular to the longitudinal axis A2 in a plane perpendicular to the first axis of rotation A84 is denoted by e10; between the first axis of rotation A84 and the point of contact P100 of the force-receiving surface S'10 of the first jaw 10 and the surface S14 in the plane perpendicular to the first axis of rotation A84. The plane perpendicular to the first axis of rotation A84 is, in the example shown in the figures, the plane shown in FIG. 4, where the radial gap e10 is identified.

The radial gap e10 is the lever arm with respect to the axis of rotation A84 of the force transmitted between the surfaces S14 and S'10 when the first jaw 10 is in the clamping position thereof. The radial difference e10 has a value greater than the value of the first distance D10.

Thereof comes in particular from the fact that the force-receiving surface S'10 is provided on the edge of a protrusion 108 defined by the lateral arm 104, opposite the tapped orifice 102 with respect to a plane parallel to the first axis of rotation A84 and containing the longitudinal axis A2.

Thereby, the lever arm, about the first axis of rotation A84, of the force transmitted between the surfaces S14 and S'10 is greater than the maximum lever arm of the clamping force exerted on the hose 2 by the support surface S10 of the first jaw 10. The force transmitted between the surfaces S14 and S'10 is thus amplified by the ratio between the value of the radial gap e10 and the value of the distance D10. It is thus guaranteed that the first jaw 10 is effectively held in the clamping position by the pusher 14 and the spring 16, despite the resisting force exerted by the hose D2.

Advantageously, a ratio between the value of the first axial difference e10 and the value of the first distance D10 is comprised between 1.5 and 10, preferably between 4 and 6, and more preferably equal to 5.

The pusher 14 also defines a second support surface S'14 which, in the example shown in the figures, is coplanar with the first support surface S14, even if thereof is not mandatory.

The second support surface S'14 is preferably perpendicular to the longitudinal axis A14 and is configured to abut against the force receiving-surface S'12 of the second jaw 12, as can be seen in FIG. 3.

A radial gap measured perpendicular to the longitudinal axis A12 and in a plane perpendicular to the second axis of rotation A85 shall be denoted by e12; between the second axis of rotation A85 and the point of contact P120 of the force-receiving surface S'12 of the second jaw 12 and of the surface S'14. The plane perpendicular to the second axis of rotation A85 is, in the example shown in the figures, the plane shown in FIG. 3, where the distance e12 is identified.

The surface S'14 exerts, under the action of the spring 16, a bearing force on the force-receiving surface S'12 which by default returns the second jaw to the clamping position thereof.

The radial distance e12 is the lever arm with respect to the axis of rotation A85 of the force transmitted between the surfaces S'14 and S'12 when the second jaw 12 is in the clamping position thereof. The radial difference e12 has a value greater than the value of the distance D12.

Thereby, the lever arm, about the second axis of rotation A85, of the force transmitted between the surfaces S'14 and S'12, is greater than the maximum lever arm of the clamping force exerted on the hose 2 by the support surface S12 of the second jaw 12. The force transmitted between the surfaces S'14 and S'12 is thus amplified by the ratio between the radial gap value e12 and the value of the distance D12. It is thus guaranteed that the second jaw 12 is effectively held in the clamping position by the pusher 14 and the spring 16, despite the resisting force exerted by the hose D2.

The pusher 14 also comprises a finger 148 which is engaged in the recess 126 of the second jaw 12. The finger 148 is a relief of the pusher 14 intended to interact with the second jaw 12. In a variant, the finger 148 may be replaced by another relief. Whether the finger or some other relief is involved, same exerts on the second jaw 12 a force to move the jaw from the clamping position thereof to the retracted position thereof, as explained hereinafter.

When a user exerts a torque C106 on the lever 106 about the first axis of rotation A84, the effect of which is to change the lever and hence the whole of the first jaw 10 from the position of the inserts A) to the position of the inserts B) shown in FIGS. 2 to 4, the arm 104 of the first jaw 10, which is secured to the lever 106, exerts through the protrusion 108 thereof, a force which pushes the pusher 14 toward the rear end 64 of the body 6. In other words, the surface S'10 then forms a support surface against the surface S14 which receives the force exerted by the jaw 10, the force having an axial component parallel to the longitudinal axis A2 and oriented rearwards, which opposes the elastic force of the spring 16.

If the torque exerted C106 is sufficiently intense, the pusher 14 moves backwards under the action of the force transmitted between the surfaces S'10 and S14, which is visible by comparing the inserts B) to the inserts A) in FIGS. 2 to 4. Thereof is what makes it possible to return the jaw 10 to the retracted position thereof shown in the inserts B) of FIGS. 2 to 4.

The finger 148 of the pusher 14 moves back with the rest of the pusher, which has the effect of exerting on the concave surface of the hook 127, in the recess 126, a force for driving the jaw 12 toward the rear end 64 of the body 6. Thereof moves the second jaw 12 toward the retracted position thereof shown in the inserts B) of FIGS. 2 to 4.

Thereby, the operation of the lever 106, which consists in folding same down towards the surfaces S"6 and S"8, has the effect of moving the two jaws 10 and 12 from the clamping positions thereof to the respective retracted positions thereof.

Reaching such retraction positions makes it possible to insert the hose D2 onto the front part 42 of the hollow channel 4, without being hindered by the jaws 10 and 12.

It is then possible for the user to release the lever 106 which then exerts no torque on the first jaw, about the first axis of rotation A84, in such a way that the pusher 14 subject to the action of the spring 16 effectively pushing the two jaws 10 and 12 toward the respective clamping positions thereof, by means of the support surfaces S14 and S'14 thereof which act on the force-receiving surfaces S'10 and S'12.

Taking into account the ratio between the values e10/D10 and e12/D12, the elastic force exerted by the spring 16 is amplified and effective to return and then maintain the two jaws 10 and 12 in the clamping position, despite the resisting force exerted on the bearing surfaces S10 and S12 by the outer radial surface of the hose D2.

l14 denotes the maximum width of the pusher 14 measured perpendicularly to the longitudinal axis A14. The width defines the radial size of the pusher 14, i.e. the minimum diameter of a circle through which the pusher 14 can extend.

The width I14 is strictly greater than the diameters D63 and D67.

Thereby, the pusher cannot be inserted into the body 6, or leave therefrom, through the front 62 and rear 64 ends thereof.

For the purpose of optimizing the manufacturing range of the coupling element 2, the components 6 and 14 are produced simultaneously by additive manufacturing by binder jetting, sometimes referred to as "additive machining by binder jetting". The principle of additive machining by jet of binder consists in depositing a thin layer of powder material, then in applying a binder which will agglomerate the powder grains exposed to heat or light. The source of heat or of light is movable in a plane and makes possible the agglomeration of grains corresponding to a slice of the parts. The production of the parts is thus carried out in successive slices parallel to an initial laying plane. In the case of simultaneous machining of the body 6 and of the pusher 14, the initial laying plane may be chosen as the plane perpendicular to the longitudinal axis A2 and situated at the end of the rear end 64 of the body. The body 6 and the pusher 14 are made slice by slice simultaneously without it being necessary to provide a connection between the two parts. The parts are held in place by powder grains that have not been agglomerated. Once the body 6 and the pusher 14 have been produced, it is necessary to discharge the grains of powder which have not been agglomerated.

The body 6 and the pusher 14 are made of the same material. For example, the powder may be a polyamide and the binder may be activated by heat.

Additive manufacturing makes it possible to produce, in one operation, a first hollow part wherein a second part is arranged, such as the body 6 wherein the pusher 14 is arranged, without limiting the fitting of the second part within the first hollow part.

Figure 6:
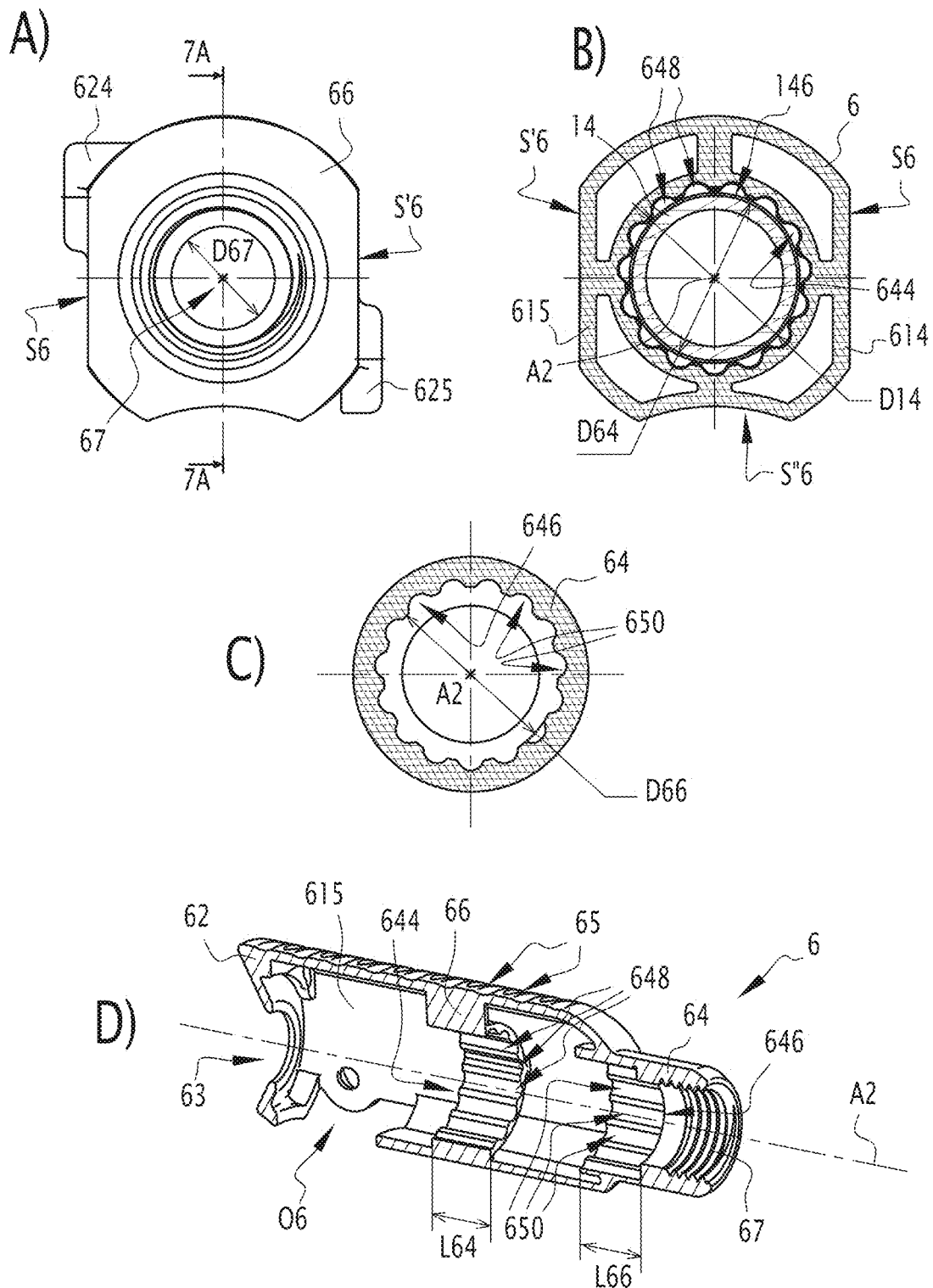
FIG. 6 shows, on three inserts A), B) and C), an elevation view and cross-sections of a body and a pusher of the coupling element of FIGS. 1 to 5 being manufactured, as well as on one insert D), a longitudinal perspective section of the body, on a smaller scale.
Figure 7:
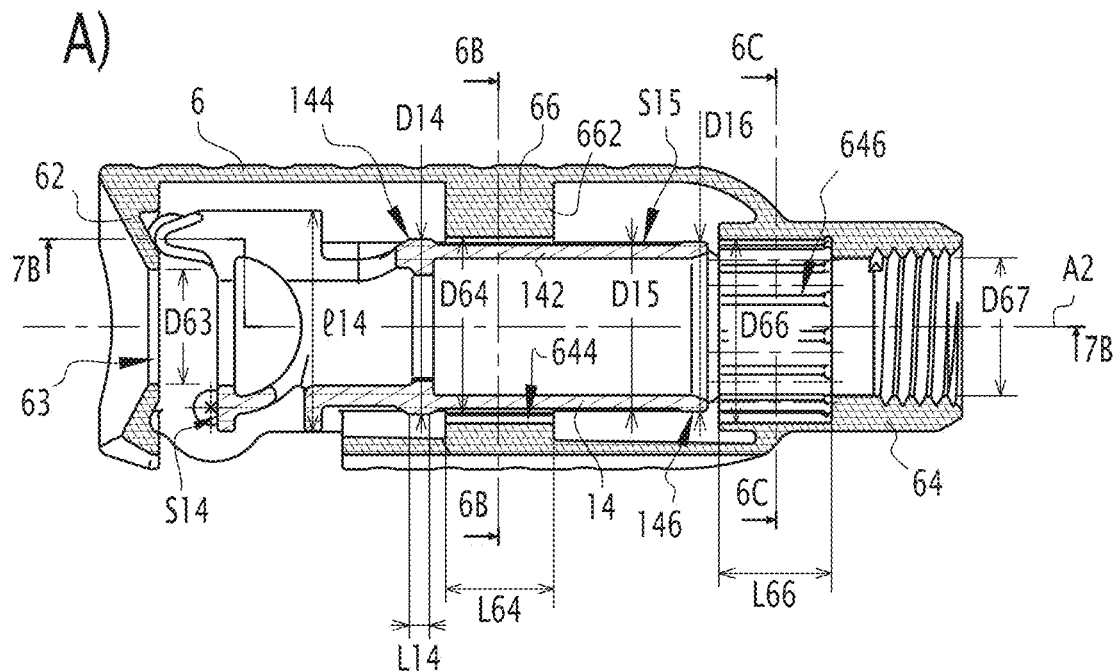
FIG. 7 shows, on two inserts A and B, two longitudinal sections of the body and of the pusher, taken along the plane 7A-7A at insert A) in FIG. 6 and along the line 7B-7B at insert A) in FIG. 7, respectively.
Figure 7:
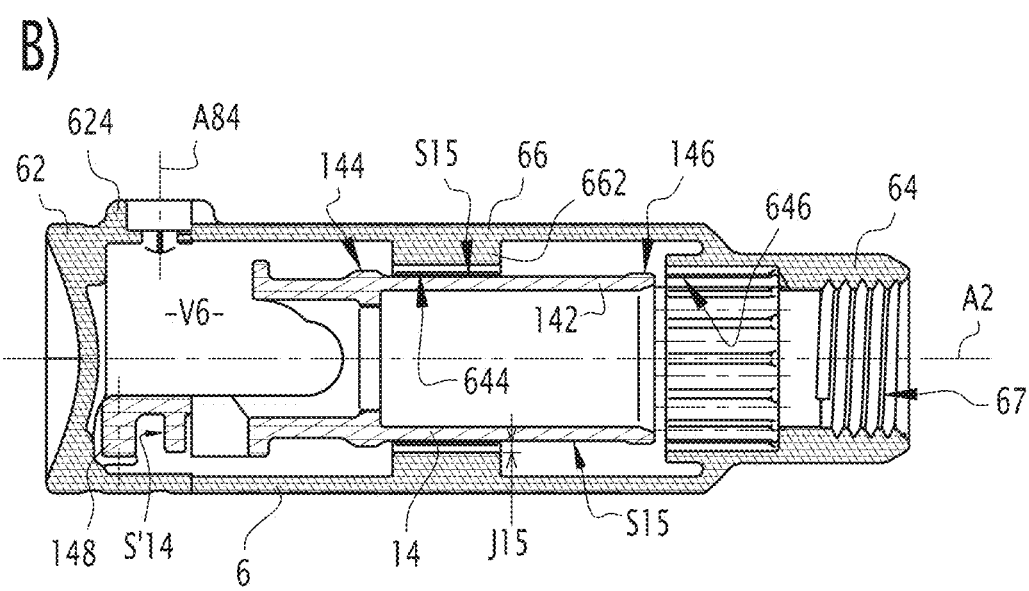

To make possible such additive manufacturing, the pusher 14 is movable inside the body 6 as far as a reference position shown in FIGS. 6 and 7 wherein the outer radial surfaces 144 and 146 of the pusher 14 are disengaged from the inner radial surfaces 644 and 646 of the body 6. In other words, in the reference position, the outer radial guiding surfaces 144 and 146 are offset axially, along the longitudinal axis A2, from the inner radial guiding surfaces 644 and 646.

In the reference position, the rear part of the skirt 142 is no longer engaged in the rear part 64 of the body 6 and the front part of the skirt 142 is situated further forward, along the longitudinal axis A2, than the internal rib 662.

In the reference position, the outer and inner radial guiding surfaces 144, 146, 644 and 646 can be produced by localized application of the binder to the powder, without risk of contact or untimely attachment between the surfaces, even if the guiding clearance J14 has a small radial thickness, since same are axially offset from each other along the longitudinal axis A2.

In the reference position, the front inner radial guiding surface 644 faces, i.e. is axially aligned along the longitudinal axis A2 with the junction surface S15.

Thereby, there is a manufacturing clearance J15 between the junction surface S15 and the inner radial surface 644. The manufacturing clearance J15 has a radial thickness strictly greater than the radial thickness of the guiding clearance J14.

For example, the manufacturing clearance J15 may have a radial thickness greater than or equal to 0.5 mm, preferably equal to 1 mm.

In other words, in the reference position which is used for the additive manufacturing of the elements 6 and 14 of the coupling element 2, there is a relatively large radial clearance J15 between the pusher 14 and the rib 662, the radial clearance being thicker than the clearance J14 which serves to guide the pusher 14 in translation relative to the body 6.

Thereof facilitates the removal of powder grains that are not bound together by the binder during the additive manufacturing, in the vicinity of the guiding surfaces.

In this respect, the presence of the grooves 648 at the inner radial front guiding surface 644 facilitates the discharge of the excess powder.

The presence of grooves 650 on the rear inner radial guiding surface 646 also facilitates the discharge of excess powder, most particularly in a variant of the invention (not shown), wherein a part of surface comparable to the surface S15 is engaged in the rear inner radial guiding surface 646 in the reference position of the pusher 14.

Once the body 6 and the pusher 14 have been obtained simultaneously by additive manufacturing, the assembly of the coupling element 2 comprises successive steps, carried out in the order hereinbelow and consisting of:

moving the pusher 14 to a rear stop position in the body 6 of the coupling element, i.e. moving the pusher 14 from the reference position shown in FIGS. 6 and 7 to a position comparable to the position of the inserts B) in FIGS. 2 to 4 wherein the outer radial guiding surfaces 144 and 146 are engaged in the inner radial guiding surfaces 644 and 646;

pre-positioning the two jaws 10 and 12 in the housing 8;

engaging the housing 8 equipped with jaws 10 and 12 in the body 6, through the opening O6, taking care that the lateral arm 105 of the second jaw 12 effectively cooperates with the finger 148 of the pusher 14, i.e. by ensuring that the finger 148 is properly engaged in the recess 126 of the second jaw;

fitting and screwing screws 94 and 95 into tapped holes 102 and 122, respectively, of the jaws 10 and 12;

fitting the return spring 16 of the pusher 14 in the internal volume of the body, bearing against a shoulder 141 of the pusher;

fitting and screwing the hollow channel 4 inside the pusher 14 and the body 6, by means of the thread 47 and the tapping 67, bringing the spring 16 to bear against a shoulder 41 of the hollow channel.

In order to couple the coupling element 2 and the hose D2, the user takes the body 6 in his/her hand and moves the lever 106 toward the surfaces S"6 and S"8 by exerting the torque C106, which brings the jaws 12 and 14 into the respective retracted positions thereof. It is then sufficient to align the hose D2 along the longitudinal axis A2 and to move the hose toward the hollow channel 4, while keeping the lever 106 pressed against the body 6. Such operation is facilitated by the fact that the front part 42 of the hollow channel 4 sticks out from the body 6 and is provided with the chamfer 48.

At a first stage of the approach, the hose D2 comes into contact with the front part 42 of the hollow channel and slides along the front part. The approach continues until the front face of the hose D2 abuts against a shoulder 43 of the hollow channel which delimits the rear end of the front part 42. The hose then covers the peripheral ribs 46. The jaws 10 and 12 are still held in the retracted position by the torque C106 which the user continues to exert on the lever 106. The jaws thus do not oppose the fitting together.

By releasing the lever 106, i.e. by ceasing to exert the torque C106, the user allows the jaws to return to the clamping position, under the action of the pusher 14 elastically loaded by the spring 16.

The hose D2 is then mounted, fluidically connected to, and firmly held in relation to, the coupling element 2.

To uncouple the hose D2 from the coupling element 2, it suffices to take the body 6 in hand and to push the lever 106 toward the body by means of the torque C106, which brings the two jaws 10 and 12 back into the respective retracted positions thereof. The user can then grip the hose and pull same parallel to the longitudinal axis A2, in a direction away from the hollow channel 4. Since the jaws are held in the retracted positions thereof, same do not oppose the removal of the hose D2.

Figure 8:
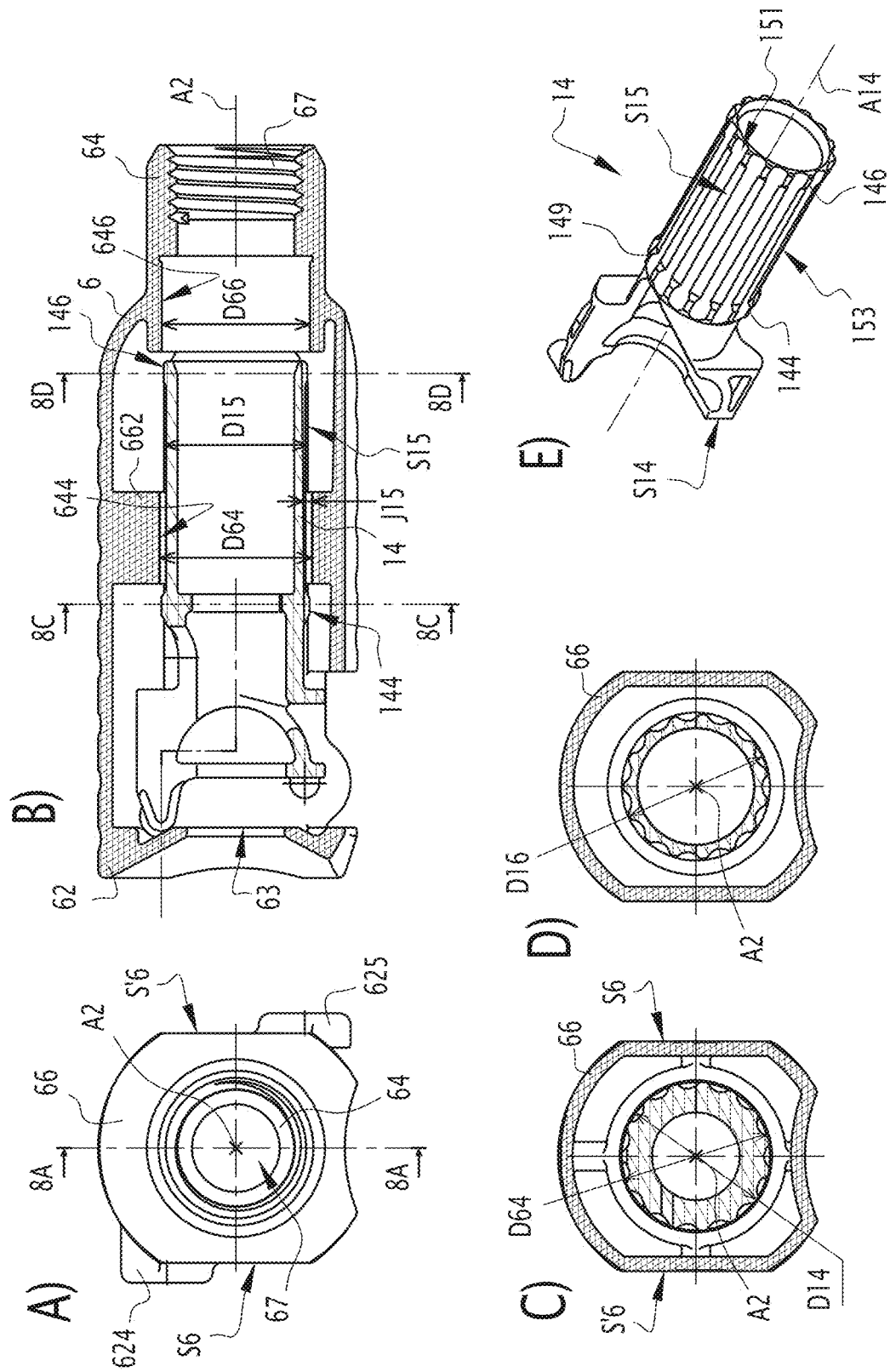
FIG. 8 shows, on inserts A), B), C), D) and E) comparable to FIGS. 6 and 7, a body and a pusher of a coupling element according to a second embodiment of the invention.

In the second, third and fourth embodiment of the invention shown in FIG. 8 and seq., elements similar to the elements of the first embodiment have the same references. Hereinafter, we mainly describe what distinguishes said embodiments from the first embodiment. If a reference is given in one of the FIG. 8 et seq. without being mentioned in the description, or mentioned in the description without being mentioned in one of the figures, the reference corresponds to the same element as that identified by the same reference in the first embodiment.

In the second embodiment shown in FIG. 8, the inner radial guiding surfaces 644 and 646 provided on the body 6 are smooth, i.e. without grooves, whereas the front and rear outer radial guiding surfaces 144 and 146 of the pusher 14 are provided with grooves 149 and 151, respectively.

The outer diameter D14 of the outer radial guiding surfaces 144 and 146, measured at the apex of the separating ribs the grooves 149 and 151, is slightly smaller than the inner diameter D64 of the inner radial guiding surfaces 644 and 646, which makes it possible to create a guiding clearance, comparable to the guiding clearance J14 of the first embodiment, between the surfaces 144 and 644 on the one hand, and 146 and 646, on the other hand.

A junction surface S15, defined as in the first embodiment, has a diameter D15 strictly smaller than the diameter D14 and is also equipped with grooves 153.

A manufacturing clearance J15 is present, between the junction surface S15 and the front inner radial guiding surface 644, when the pusher 14 is in the reference position shown in the inserts A) to D) of FIG. 8, the reference position being defined as in the first embodiment.

Figure 9:
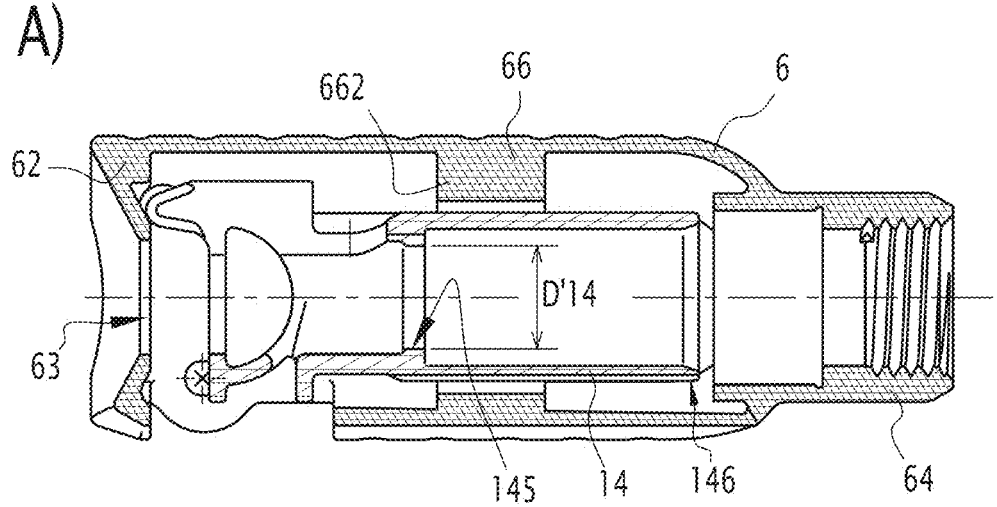
FIG. 9 shows, on two inserts A) and B), respectively a longitudinal section of a body and a pusher of a coupling element according to a third embodiment of the invention, during manufacture, and a longitudinal section of the coupling element ready for use.
Figure 9:
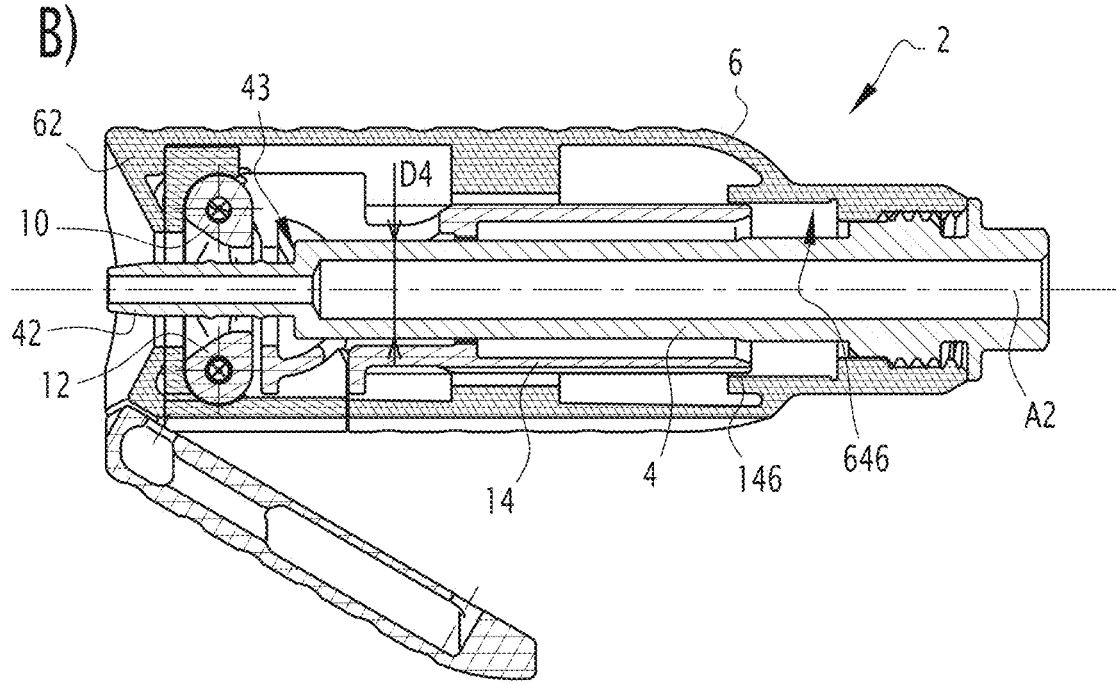

In the third embodiment of the invention shown in FIG. 9, the translational guidance between the pusher 14 and the body 6 is achieved solely at the rear outer radial guiding surface 146 which cooperates with the rear inner radial guiding surface 646. The skirt 142 of the pusher 14, on the outside, has the same geometry throughout the length thereof. More particularly, there is no junction surface of smaller diameter comparable to the surface S15 of the first and second embodiments.

On the other hand, the pusher 14 is equipped with a radial internal front guiding surface 145 the internal diameter of which is denoted by D'14. Said diameter is slightly larger than the outer diameter D4 of the hollow channel 4, behind the shoulder 43 thereof, which makes it possible to guide the pusher 14 in axial translation along the hollow channel 4, with a clearance of small radial thickness, comparable to the clearance J14 of the first embodiment.

In the second and third embodiments, the one-piece body 6 and the pusher 14 are made together by additive manufacturing, the pusher then being in a reference position where the outer radial guiding surface(s) thereof, 144 and 146, or only 146, are not opposite the corresponding inner radial guiding surfaces 644 and 646, or only 646.

Figure 10:
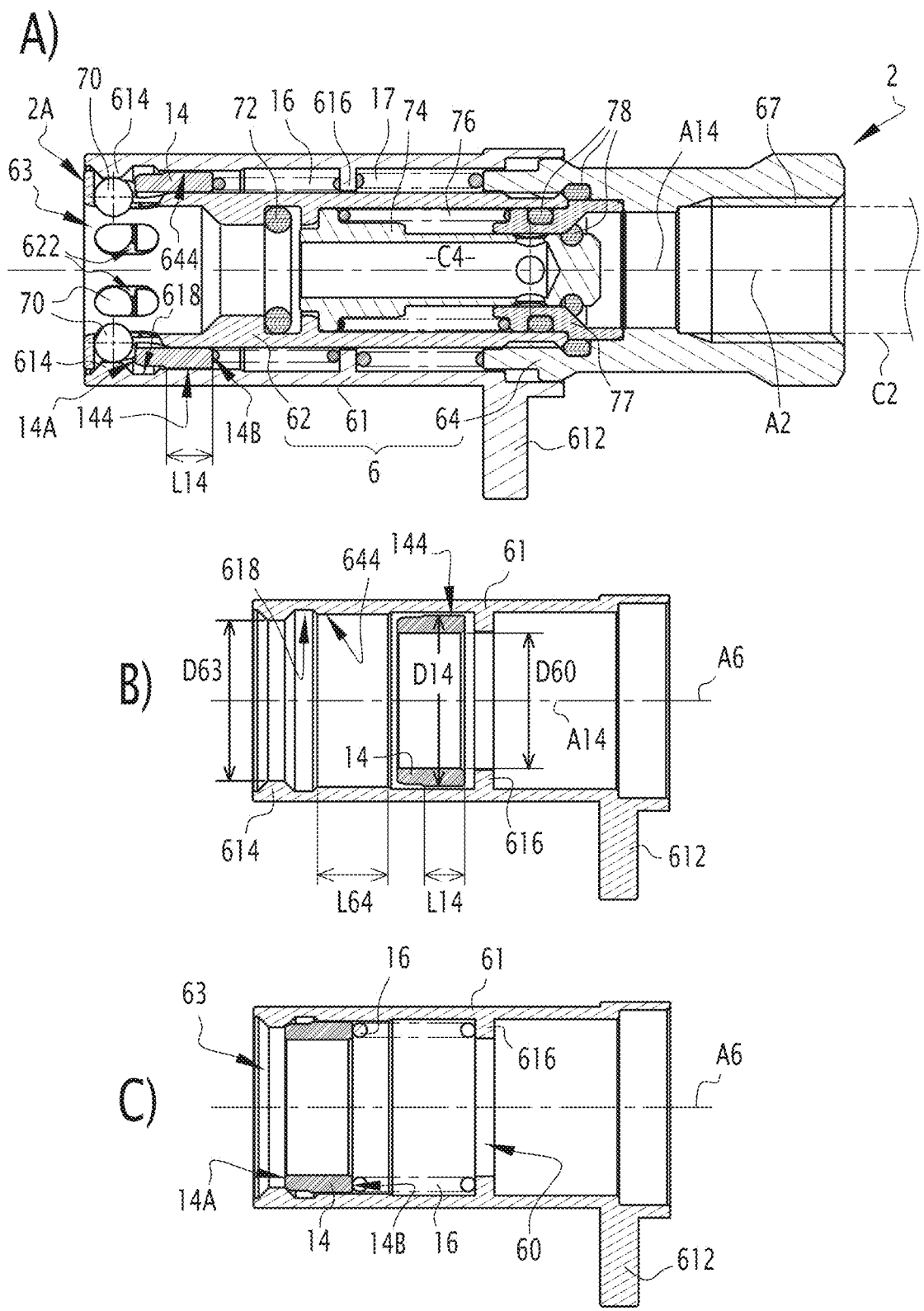
FIG. 10 shows, on three inserts A), B) and C), a coupling element according to a fourth embodiment, more precisely a longitudinal section of the coupling element on insert A), and two longitudinal cuts of an external part of the body and of a pusher of the coupling element during two steps of manufacture of the latter.

In the fourth embodiment of the invention shown in FIG. 10, a female quick-coupling element 2 includes a three-part body 6, which includes a front or distal internal part 62, a rear or proximal internal part 64 screwed on top of the other, as well as an external part 61 in the form of a ring which surrounds the internal parts 62 and 64 and which is movable along a longitudinal axis A2 of the coupling element 2, with respect to the front and rear internal parts 62 and 64. The external part 61 comprises a radial protrusion 612 which makes it possible to exert on the external part a force parallel to the axis A2 and opposite an elastic force exerted by a spring 17.

The rear internal part 64 is equipped with a tapping 67 for screwing fitting on a pipe C2.

The external part 61 and the internal front part 62 define an opening 63 of the coupling element 2. The internal front part 62 is pierced by a plurality of longitudinal apertures 622 which open out into the mouth. Balls 70 are engaged in the apertures 622 and protrude to a greater or lesser extent into the mouth 63, depending on whether or not same are pushed toward the longitudinal axis A2 by an internal radial collar flange 614 of the external part 61 of the body 6.

The balls 70 are designed to engage in an external peripheral groove of a male end-piece, mating to the coupling element 2, known per se and not shown. The balls form locking members for locking the male end-piece in the female coupling element 2.

In a variant of the invention (not shown), locking members other than the balls 70 may be used.

The female coupling element 2 also comprises an O-ring seal 72, intended to bear against the male end-piece, and a valve disk 74 elastically loaded by a spring 76, in such a way that same by default shuts off an internal channel C4 defined both by the valve disk 74 and by the body 6. A seat 77 is mounted in the body 6 and receives the valve disk 74 in abutment when same is in the position of shutting off the duct C4. O-ring seals 78 are mounted between the body 6, the seat 77 and the valve disk 74. The spring 76 is fitted between the valve disk 74 and the seat 77.

A pusher 14 is mounted in a radial gap defined between the parts 61 and 62 of the body 6. The pusher is elastically loaded toward the front of the coupling element 2 by a spring 16 also arranged in the gap and which abuts both against a rear face 14B of the pusher 14 and against an internal rib 616 of the external part 61 of the body 6.

60 denotes the central opening of the external part 61 of the body 6, which is defined by the collar flange 616, which is a proximal opening, insofar as same is closer to the duct C2 than the mouth 63 which forms a distal opening of the body 6. When the female coupling element 2 and the mating end-piece (not shown) are connected, the fluid circulating in the quick-coupling thereby formed flows through the opening 60. D60 denotes the diameter of the opening 60, i.e. the inner diameter of the external part 61 of the body 6 on the proximal side, at the rib 616.

The effect of the pusher 14 is to bring the balls 70 back into position toward the front of the slots 622, so that same are by default aligned, along the longitudinal axis A2, with the collar flange 614 and, consequently, returned into the mouth 63. Herein, the pusher 14 has the form of a ring and may also be called a "memory ring" or "slide" because same ensures, by sliding with respect to the body 6, the return of the balls 70 to the default position thereof.

In order to make possible the passage of the male end-piece in a direction of fitting together of the male and female components of the quick-coupling, the balls 70 should be able to move, according to the largest dimension of the apertures 622, to a disengaged position situated on the rear of the apertures, opposite a set-back zone 618 defined inside the external part 61 of the body 6. To this end, the balls 70 can exert on a front face 14A of the pusher 6 an axial force against the elastic force exerted by the spring 16, which has the effect of making the pusher 14 to move back into the gap formed radially between the parts 61 and 62 of the body 6.

The pusher 14 is thus movable in axial translation along the longitudinal axis A2 and under the action of the spring 6 and of the balls 70, relative to the body 6, more particularly the external part 61 thereof. To this end, the pusher 14 defines an outer radial guiding surface 144 which cooperates with an internal radial guiding surface 644 formed on the inside of the external part 61 of the body 6, beyond the zone 618 set back with respect to the front face 2A of the coupling element 2.

L14 denotes the axial length of the outer radial guiding surface 144 of the pusher 14. L64 denotes the axial length of the inner radial guiding surface 644 of the body 6. The axial lengths L14 and L64 are measured parallel to the longitudinal axis A2.

The length L64 is greater than or equal to the sum of the length L14 and the travel C of displacement of the pusher 14 with respect to the body 6, between the position thereof wherein same returns the balls toward the front of the body 6 and the position wherein same allows the balls to be engaged in the set-back zone 618.

The following relation stands:

$$L64 \geq L14 + C \quad \text{(equation 1a)}$$

By means of such relation between the lengths L14 and L64 and the travel C, during the operation of the coupling element 2, the outer radial guiding surface 144 of the pusher 14 remains opposite the inner radial guiding surface 644 of the body 6.

The inner diameter of the external part 61 of the body 6, at the collar flange 614, defines the minimum value of the diameter D63 of the mouth 63.

The outer radial guiding surface 144 is denoted by D14. The diameter D14 defines the maximum size of the pusher 14, radially to the longitudinal axis A14 of the pusher 14. The diameter D14 is strictly greater than the diameters D60 and D63.

The pusher 14 can be brought into a reference position shown in the insert B) of FIG. 10 wherein the outer radial guiding surface 144 is disengaged from the inner radial guiding surface 644, i.e. axially offset from said surface, along a central axis A6 of the body 6 which is superimposed with the longitudinal axes A2 and A14 in the mounted configuration of the coupling element 2.

In such reference position, as the guiding surfaces 144 and 644 are axially offset, it is possible to simultaneously produce same by additive manufacturing, by locally adding a binder which can be thermally activated, to a powder such as polyamide powder, which makes it possible to manufacture the elements 61 and 14 nested one inside the other.

From such position, it is possible to bring the pusher 14 into a working position, as shown in the insert C) of FIG. 10, by fitting the spring 16 between the rear face 14B of the pusher 14 and the rib 616. In such working position, the radial guiding surfaces 144 and 644 face each other, along a direction radial to the central axis A6, i.e. engaged one inside the other.

Any feature described in the foregoing for one embodiment or one variant, can be implemented for the other embodiments and variants described hereinabove, provided that is technically feasible.

More particularly, in the first three embodiments, the reference position of the pusher is in front of the position of use of the latter, during the movements thereof over the travel thereof relative to the body 6, whereas in the fourth embodiment, the reference position and of the pusher 6 is rearward from the position of use of the latter, along the travel with respect to the body 6. The opposite is conceivable.

Additive machining techniques other than additive machining by binder jetting can enable the body 6 and the pusher 14 to be produced simultaneously. For example, the Multi-Jet Printing (MJP) additive machining technique implemented by a 3D printer can be used. The MJP printer mainly consists of a printhead, a platform and a UV lamp. Like any 3D printing machine, the process requires a 3D CAD file. The 3D printer then prints each layer of the UV-curable liquid plastic file on a flat platform. A support material made of wax is also sprayed to fill voids internal to a part or existing between two nested parts produced simultaneously. At the end of the machining of the body 6 and of the pusher 14, the wax which allows the pusher to be held is easily removed due to the features of the invention. The additive machining technique serves to produce the body 6 and the pusher 14 in different materials.

The present invention relates to a quick-coupling element (2) including a body (6) and a pusher (14) captive and movable within the monobloc body. The body (6) is provided with at least one inner radial guiding surface (644, 646). The pusher (14) is provided with at least one outer radial guiding surface (144, 146) which cooperates with the inner radial guiding surface. Sections of a proximal opening (67) and of a distal mouth (63) of the body (6) have maximum dimensions (D67, D60) less than a radial size (L14, D14) of the pusher (14). The pusher is movable, in an internal volume (V6) of the body, to a reference position, wherein the outer radial surface (144, 146) of the pusher is disengaged from any inner radial surface (644, 646) of the body (6), and vice versa.

The invention claimed is:

1. A quick-coupling element for connecting fluid lines, said coupling element comprising:
    a monobloc body defining a passage extending along a longitudinal axis of the coupling element between a proximal end and a distal end, the proximal end being configured for connection to a fluid pipe and defining a proximal opening for the passage of a fluid or for connecting a hollow channel through which the fluid flows and the distal end having a distal mouth for receiving a mating coupling element;
    wherein:
    the coupling element comprises a pusher mounted in the body and movable along the longitudinal axis between a forward position toward the distal end side and a rearward position toward the proximal end;
    the body is provided with at least one inner radial guiding surface;
    the pusher is provided with at least one outer radial guiding surface configured to engage the inner radial guiding surface to guide the pusher during movements thereof along the longitudinal axis between the forward and rearward positions thereof;
    the pusher has a radial size defined by a largest radial dimension thereof;
    a section of the proximal opening, transverse to the longitudinal axis, has a maximum dimension smaller than the radial size of the pusher;

a section of the distal mouth, transverse to the longitudinal axis, has a maximum dimension less than the radial size of the pusher;

the pusher is mounted captive in an internal volume of the body; and the pusher is movable, in the internal volume of the body, to a reference position, wherein each outer radial guiding surface of the pusher is disengaged from all inner radial guiding surfaces of the body and each inner radial guiding surface of the body is disengaged from all outer radial guiding surfaces of the pusher.

2. The coupling element according to claim 1, wherein, when the pusher is in the reference position, a clearance between a surface of the pusher and an inner radial surface of the body facing the surface of the pusher has a radial thickness greater than the radial thickness of a guiding clearance between the outer radial surface of the pusher and the inner radial surface of the body engaged in one another.

3. The coupling element according to claim 1, wherein:
the pusher is provided with two outer radial guiding surfaces spaced apart along the longitudinal axis;
the body is provided with two inner radial guiding surfaces;
each inner radial guiding surface is configured to engage with an inner outer radial guiding surface, respectively, to guide the pusher during the movements thereof along the longitudinal axis between the forward and rearward positions thereof; and
when the pusher is in the reference position, the two outer radial guiding surfaces thereof are disengaged from the two inner radial guiding surfaces of the body.

4. The coupling element according to claim 1, wherein:
the outer radial guiding surface is inscribed in a first cylinder with a circular base;
the inner radial guiding surface is inscribed in a second cylinder having a circular base; and
a diameter of the first cylinder is equal to a diameter of the second cylinder, within a guiding clearance.

5. The coupling element according to claim 1, wherein clearance grooves are formed in the inner radial guiding surface.

6. The coupling element according to claim 1, wherein clearance grooves are provided in the outer radial guiding surface.

7. The coupling element according to claim 1, wherein:
the outer radial guiding surface has a first length, measured parallel to the longitudinal axis;
the inner radial guiding surface has a second length measured parallel to the longitudinal axis; and
the second length is greater than or equal to a sum of the first length and a travel of the pusher between the forward and rearward positions thereof; or
the first length is greater than or equal to the sum of the second length and the travel of the pusher between the forward and rearward positions thereof.

8. The coupling element according to claim 1, further comprising:
the hollow channel defining a passage for fluids and extending along a longitudinal axis of the coupling element, between a front part configured for a fitting on of a hose and a rear part to be coupled to the fluid pipe;
the monobloc body extending longitudinally about the hollow channel and secured thereto, defining a mouth for access to the front part of the hollow channel;
a first jaw, movable in rotation about a first axis of rotation perpendicular to and offset from the longitudinal axis between;

a clamping position wherein the first jaw presses the hose against the front part of the hollow channel in a zone that extends in a radial direction relative to the longitudinal axis between the longitudinal axis and the first axis of rotation, and is bounded along the longitudinal axis by a boundary plane that is perpendicular to the longitudinal axis and spaced from the first axis of rotation by a first, non-zero distance that is measured parallel to the longitudinal axis; and a retracted position wherein the first jaw does not press the hose against a forward part of the hollow channel;

a maneuvering member, accessible from outside the body, for moving the first jaw between the clamping position thereof and the retracted position thereof;

a member for elastic return of the pusher toward the forward position thereof;

wherein the pusher is trapped inside the internal volume of the body, around the hollow channel and provided with a first support surface against the first jaw;

wherein the first support surface of the pusher is configured to exert on the first jaw, a force for moving the first jaw from the retracted position thereof to the clamping position thereof;

wherein the first support surface is arranged opposite the first axis of rotation in relation to the longitudinal axis; and wherein, when the first jaw is in the clamping position thereof, with the first support surface against the first jaw, a first radial gap, measured perpendicular to the longitudinal axis, between the first axis of rotation and a contact point of a force-receiving surface of the first jaw and the first support surface has a value greater than the value of the first distance.

9. A method of manufacturing a quick-coupling element for connecting fluid lines, the method comprising:
a) producing a quick-coupling element according to claim 1 and by simultaneously producing by additive manufacturing at least part of the monobloc body and the pusher, while the pusher is in the reference position thereof.

10. A quick-coupling element for connecting fluid lines, said coupling element comprising:
a monobloc body defining a passage extending along a longitudinal axis of the coupling element between a proximal end and a distal end, the proximal end being configured for connection to a fluid pipe and defining a proximal opening for the passage of a fluid or for connecting a hollow channel through which the fluid flows and the distal end having a distal mouth for receiving a mating coupling element;
wherein:
the coupling element comprises a pusher mounted in the body and movable along the longitudinal axis between a forward position toward the distal end and a rearward position toward the proximal end;
the body is provided with at least one inner radial guiding surface;
the pusher is provided with at least one outer radial guiding surface configured to engage the inner radial guiding surface to guide the pusher during movements thereof along the longitudinal axis between the forward and rearward positions thereof;
the pusher has a radial size defined by a largest radial dimension thereof;

a section of the proximal opening, transverse to the longitudinal axis, has a maximum dimension smaller than the radial size of the pusher;
a section of the distal mouth, transverse to the longitudinal axis, has a maximum dimension less than the radial size of the pusher;
the pusher is mounted captive in an internal volume of the body; and
the pusher is movable, in the internal volume of the body, to a reference position, wherein each outer radial guiding surface of the pusher is disengaged from all inner radial guiding surfaces of the body and each inner radial guiding surface of the body is disengaged from all outer radial guiding surfaces of the pusher;
the pusher is provided with two outer radial guiding surfaces spaced apart along the longitudinal axis;
the body is provided with two inner radial guiding surfaces;
each inner radial guiding surfaces is configured to engage with an inner radial guiding surface, respectively to guide the pusher during the movements thereof along the longitudinal axis between the forward and rearward positions thereof; and
when the pusher is in the reference position, the two outer radial guiding surfaces thereof are disengaged from the two inner radial guiding surfaces of the body.

11. The coupling element according to claim 10, wherein, when the pusher is in the reference position, a clearance between a surface of the pusher and an inner radial surface of the body facing the surface of the pusher has a radial thickness greater than the radial thickness of a guiding clearance between the outer radial surface of the pusher and the inner radial surface of the body engaged in one another.

12. The coupling element according to claim 10, wherein:
the outer radial guiding surface is inscribed in a first cylinder with a circular base;
the inner radial guiding surface is inscribed in a second cylinder having a circular base; and
a diameter of the first cylinder is equal to a diameter of the second cylinder, within a guiding clearance.

13. The coupling element according to claim 10, wherein clearance grooves are formed in the inner radial guiding surface.

14. The coupling element according to claim 10, wherein clearance grooves are provided in the outer radial guiding surface.

15. The coupling element according to claim 10, wherein:
the outer radial guiding surface has a first length, measured parallel to the longitudinal axis;
the inner radial guiding surface has a second length measured parallel to the longitudinal axis; and
the second length is greater than or equal to a sum of the first length and a travel of the pusher between the forward and rearward positions thereof; or
the first length is greater than or equal to the sum of the second length and the travel of the pusher between the forward and rearward positions thereof.

16. A quick-coupling element for connecting fluid lines, said coupling element comprising:
a monobloc body defining a passage extending along a longitudinal axis of the coupling element between a proximal end and a distal end, the proximal end being configured for connection to a fluid pipe and defining a proximal opening for the passage of a fluid or for connecting a hollow channel through which the fluid flows and the distal end having a distal mouth for receiving a mating coupling element;
wherein:
the coupling element comprises a pusher mounted in the body and movable along the longitudinal axis between a forward position toward the distal end and a rearward position toward the proximal end;
the body is provided with at least one inner radial guiding surface;
the pusher is provided with at least one outer radial guiding surface configured to engage the inner radial guiding surface to guide the pusher during movements thereof along the longitudinal axis between the forward and rearward positions thereof;
the pusher has a radial size defined by a largest radial dimension thereof;
a section of the proximal opening, transverse to the longitudinal axis, has a maximum dimension smaller than the radial size of the pusher;
a section of the distal mouth, transverse to the longitudinal axis, has a maximum dimension less than the radial size of the pusher;
the pusher is mounted captive in an internal volume of the body;
the pusher is movable, in the internal volume of the body, to a reference position, wherein each outer radial guiding surface of the pusher is disengaged from all inner radial guiding surfaces of the body and each inner radial guiding surface of the body is disengaged from all outer radial guiding surfaces of the pusher;
the outer radial guiding surface has a first length, measured parallel to the longitudinal axis;
the inner radial guiding surface has a second length measured parallel to the longitudinal axis; and
the second length is greater than or equal to a sum of the first length and a travel of the pusher between the forward and rearward positions thereof; or
the first length is greater than or equal to the sum of the second length and the travel of the pusher between the forward and rearward positions thereof.

17. The coupling element according to claim 16, wherein, when the pusher is in the reference position, a clearance between a surface of the pusher and an inner radial surface of the body facing the surface of the pusher has a radial thickness greater than the radial thickness of a guiding clearance between the outer radial surface of the pusher and the inner radial surface of the body engaged in one another.

18. The coupling element according to claim 16, wherein:
the outer radial guiding surface is inscribed in a first cylinder with a circular base;
the inner radial guiding surface is inscribed in a second cylinder having a circular base; and
a diameter of the first cylinder is equal to a diameter of the second cylinder, within a guiding clearance.

19. The coupling element according to claim 16, wherein clearance grooves are provided in the outer radial guiding surface.

20. The coupling element according to claim 16, further comprising:
the hollow channel defining a passage for fluids and extending along a longitudinal axis of the coupling element, between a front part configured for a fitting on of a hose and a rear part to be coupled to the fluid pipe;
the monobloc body extending longitudinally about the hollow channel and secured thereto, defining a mouth for access to the front part of the hollow channel;
a first jaw, movable in rotation about a first axis of rotation perpendicular to and offset from the longitudinal axis between;

a clamping position wherein the first jaw presses the hose against the front part of the hollow channel in a zone extending in a radial direction relative to the longitudinal axis between the longitudinal axis and the first axis of rotation, and is bounded along the longitudinal axis by a boundary plane that is perpendicular to the longitudinal axis and spaced from the first axis of rotation by a first, non-zero distance that is measured parallel to the longitudinal axis; and a retracted position wherein the first jaw does not press the hose against a forward part of the hollow channel;

a maneuvering member, accessible from outside the body, for moving the first jaw between the clamping position thereof and the retracted position thereof;

a member for elastic return of the pusher toward the forward position thereof;

wherein the pusher is trapped inside the internal volume of the body, around the hollow channel and provided with a first support surface against the first jaw;

wherein the first support surface of the pusher is configured to exert on the first jaw, a force for moving the first jaw from the retracted position thereof to the clamping position thereof;

wherein the first support surface is arranged opposite the first axis of rotation in relation to the longitudinal axis; and wherein, when the first jaw is in the clamping position thereof, with the first support surface against the first jaw, a first radial gap, measured perpendicular to the longitudinal axis, between the first axis of rotation and a contact point of a force-receiving surface of the first jaw and the first support surface has a value greater than the value of the first distance.

\* \* \* \* \*